Jan. 16, 1923.

E. E. SCHNELLE.
BALL BEARING CENTER.
FILED OCT. 19, 1920.

1,442,364.

INVENTOR.
Ernest E. Schnelle
BY Frank Keipor.
ATTORNEY

Patented Jan. 16, 1923.

1,442,364

UNITED STATES PATENT OFFICE.

ERNEST E. SCHNELLE, OF ROCHESTER, NEW YORK.

BALL-BEARING CENTER.

Application filed October 19, 1920. Serial No. 418,101.

*To all whom it may concern:*

Be it known that I, ERNEST E. SCHNELLE, a citizen of the United States, residing at Rochester, in the county of Monroe and State of New York, have invented certain new and useful Improvements in Ball-Bearing Centers, of which the following is a specification.

The object of this invention is to provide a new and improved form of ball bearing center which eliminates all friction between work and center and with which extreme precision may be secured with a high degree of uniformity.

This and other objects of this invention will be fully illustrated in the drawings, described in the specification and pointed out in the claims at the end thereof.

In the accompanying drawing.

In the several figures of the drawing, like reference numerals indicate like parts.

Figure 1:
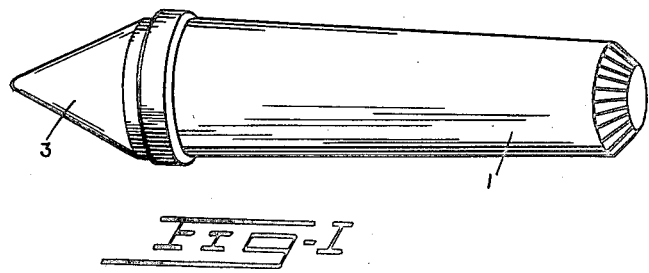
Fig. 1 is a perspective view of the ball bearing center.

In the drawing, reference numeral 1 indicates the shank of the center, which is formed by a hollow sleeve. In this sleeve is mounted to rotate the spindle 2, carrying the center point 3 on the outside thereof. The spindle 2 is supported in the sleeve by two sets of ball bearings 4 and 5, one near each end thereof. The ball races between which the balls of the ball bearing 4 are mounted, are formed in the spindle and in the sleeve, respectively, and are positioned angularly to the central axis of the spindle 2. For this purpose a cup 6 is formed between the spindle and its center point 3 and in the inner corner of this cup is provided the ball race 7. The ball race 8 of the sleeve is formed on the inside of a short extension of the sleeve, which extension is surrounded by the packing ring 9. The packing ring in turn is overlapped by the dust guard 10 formed by the outer wall of the cup 6 and is integral with the spindle 2 and its center point 3.

The rear end of the spindle 2 is provided with an extension $2^A$ of reduced diameter which is threaded and with which the ball cone 11 makes threaded engagement. The ball race formed by this cone is located at an angle to the ball race 12 formed on the inside of the sleeve 1 near the rear end thereof. In this way, the balls of both of the ball bearings 4 and 5 are held between ball races that are placed at an angle to each other. Placed behind the cone 11 is the lock washer 13 which is held in place by the check nut 14 also threaded on the threaded extension $2^A$ of the spindle. By means of this lock washer 13 and the check nut 14, the cone is locked securely in place on the spindle. The rear end of the sleeve 1 is closed by the cap 15 which makes threaded engagement with the threaded end of the sleeve to protect the ball bearing 5 from dirt and at the same time retain the lubricant therefor.

Figure 2:
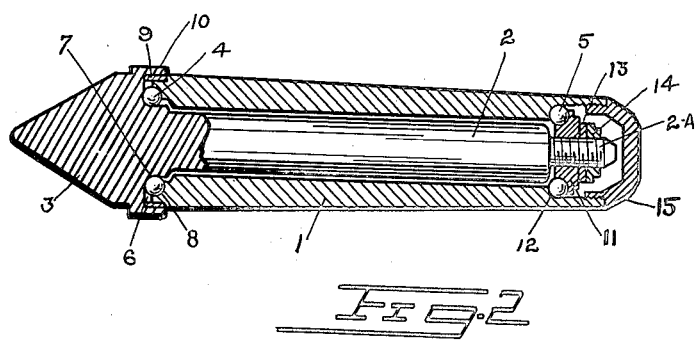
Fig. 2 is a longitudinal cross section of the center, the section being taken on the line $2^x$—$2^x$ of Fig. 1.

The spindle 2 is made to have a loose fit with the inside of the sleeve 1 and does not make contact therewith except thru the ball bearings 4 and 5, which support the spindle 2 centrally of the sleeve as shown in Fig. 2. The clearance thus provided between the periphery of the spindle and the inside of the sleeve allows the lubricant introduced into the rear end of the sleeve to flow to the ball bearing 4 so that both of the ball bearings 4 and 5 are lubricated from the same point and at the same time.

When in use the ball bearing center is carried in the tail stock of a lathe and the work to be finished on the lathe is centered on the center point of the ball bearing center. More or less thrust is exerted by the work against the center as the work is operated upon and the center must resist this thrust without giving way in the bearings. This is secured by placing the ball races at an angle to each other and to the central axis of the spindle of the center point, this angle being preferably 45°. The side thrust against the center point is thus resisted by the ball bearing without being forced out of true with the center of rotation because the ball bearing at the rear of the spindle reacts against any force that is not in line with or parallel to the central axis of the spindle.

As above pointed out, the ball races are placed at an angle to each other and they are also shaped to conform to the curvature of the ball thru a considerable angle. This conformity extends between the ball and each race for nearly 90° so that the thrust between the races and the balls is distributed over a wide area of each race. Because of this, each ball makes contact with the races not merely on a line, but on a comparatively wide annular area and this causes any one axis of each ball to continually shift, bringing all points of the sphere into contact with all points in the races. This makes the ball wear uniformly at all points and prevents the wearing of the ball along but one line of contact, which local wearing is present in ball bearings generally. The result is that the balls are kept perfectly round and uniform in size and this secures great accuracy in the rotation of the center point.

I prefer to make the balls in each race of even number and to make the odd numbered balls a few thousandths of an inch larger in diameter than the even numbered balls. In this way, the thrust will be confined to the even numbered balls and the odd numbered balls will act as idlers and greatly reduce the friction between the balls in the bearing.

Figure 3:
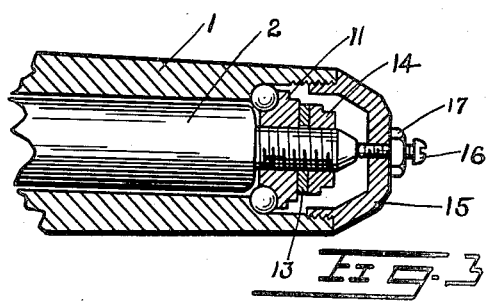
Fig. 3 is a detail sectional view of the rear end of the ball bearing center showing an adjustable thrust bearing provided therein.
Figure 4:
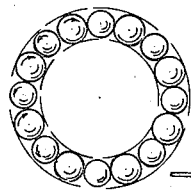
Fig. 4 is an elevation of the large and small balls in each race.

In Fig. 3, the cap 15 is provided with a screw 16, which is threaded into the cap in line with the extension of the spindle or the central axis thereof. This screw forms an extra thrust bearing for the adjustable spindle and is for heavy duty work where the thrust would be too much for the balls and races. The adjusting screw 16 is locked in place by the lock nut 17 which is threaded on the screw and can be tightened against the outside of the cap.

I claim:—

1. In a dead center adapted to be mounted in the tail stock of a lathe or grinder, etc., the combination of a spindle a head having a conical seat formed thereon provided at one end of said spindle, said head and its seat being adapted to frictionally engage and support one end of the work in the lathe and rotate with the work, a ball race formed on the head concentric with said tapered seat, a sleeve surrounding said spindle, one of said parts overlapping the other, a packing between the overlapping parts, means for holding the packing in place between the overlapping parts, a ball bearing between the forward end of the sleeve and the head and a bearing between the rear end of the sleeve and the spindle, the inside diameter of said sleeve being enlarged to overlap the bearing between said rear end of said spindle and said sleeve, a cap fastened into said enlarged end of said sleeve to hermetically seal the rear end of said sleeve and form a solid end thereon by which said ball bearing center can be driven out from the rear end of the tail stock without injury to said spindle and without injury to the accuracy of the adjustment between said spindle and said sleeve.

2. In a dead center adapted to be mounted in the tail stock of a lathe or grinder, etc., the combination of a spindle a head having a conical seat formed thereon provided at one end of said spindle, said head and its seat being adapted to frictionally engage and support one end of the work in the lathe and rotate with the work, a ball race formed on the head concentric with said tapered seat, a sleeve surrounding said spindle, one of said parts overlapping the other, a packing between the overlapping parts, means for holding the packing in place between the overlapping parts, a ball bearing of larger diameter between the forward end of the sleeve and the head and a bearing of smaller diameter between the rear end of the sleeve and the spindle, the inside diameter of said sleeve being enlarged to overlap the bearing between said rear end of said spindle and said sleeve, a cap fastened into said enlarged end of said sleeve to hermetically seal the rear end of said sleeve and form a solid end thereon by which said ball bearing center can be driven out from the rear end of the tail stock without injury to said spindle and without injury to the accuracy of the adjustment between said spindle and said sleeve.

3. In a dead center adapted to be mounted in the tail stock of a lathe or grinder, etc., the combination of a spindle a head having a conical seat formed thereon provided at one end of said spindle, said head and its seat being adapted to frictionally engage and support one end of the work in the lathe and rotate with the work, a ball race formed on the head concentric with said tapered seat, a sleeve surrounding said spindle, one of said parts overlapping the other, a packing between the overlapping parts, means for holding the packing in place between the overlapping parts, a ball bearing between the forward end of the sleeve and the head and a bearing between the rear end of the sleeve and the spindle, said sleeve being tapered to form a tapered seat, the inside diameter of said sleeve being enlarged to overlap the bearing between said rear end of said spindle and said sleeve, a cap fastened into said enlarged end of said sleeve to hermetically seal the rear end of said sleeve and form a solid end thereon by which said ball bearing center can be driven out from the rear end of the tail stock without injury to said spindle and without injury to the accuracy of the adjustment between said spindle and said sleeve.

4. In a dead center adapted to be mounted in the tail stock of a lathe or grinder, etc., the combination of a spindle a head having a conical seat formed thereon provided at one end of said spindle, said head and its seat being adapted to frictionally engage and support one end of the work in the lathe and rotate with the work, a ball race formed on the head concentric with said tapered seat, a sleeve surrounding said spindle, one of said parts overlapping the other, a packing between the overlapping parts, means for holding the packing in place between the overlapping parts, a ball bearing between the forward end of the sleeve and the head and a bearing between the rear end of the sleeve and the spindle, a cap mounted on the end of said sleeve enclosing the end of the spindle.

5. In a dead center adapted to be mounted in the tail stock of a lathe or grinder, etc., the combination of a spindle a head having a conical seat formed thereon provided at one end of said spindle, said head and its seat being adapted to frictionally engage and support one end of the work in the lathe and rotate with the work, a ball race formed on the head concentric with said tapered seat, a sleeve surrounding said spindle, one of said parts overlapping the other, a packing between the overlapping parts, means for holding the packing in place between the overlapping parts, a ball bearing between the forward end of the sleeve and the head and a bearing between the rear end of the sleeve and the spindle, a cap mounted on the end of said sleeve enclosing the end of the spindle, said sleeve cap packing and head forming an enclosed space to hold the lubricant and keep out dirt.

In testimony whereof I affix my signature.

ERNEST E. SCHNELLE.